US011327500B2

(12) United States Patent
Ollivrin et al.

(10) Patent No.: US 11,327,500 B2
(45) Date of Patent: May 10, 2022

(54) POSITIONING ASSISTANCE SYSTEM FOR A VIBRATOR TRUCK AND CORRESPONDING VIBRATOR TRUCK AND METHOD

(71) Applicant: SERCEL, Carquefou (FR)

(72) Inventors: Gilles Ollivrin, Carquefou (FR); Alexandre Maugere, Carquefou (FR)

(73) Assignee: SERCEL, Carquefou (FR)

( * ) Notice: Subject to any disclaimer, the term of this patent is extended or adjusted under 35 U.S.C. 154(b) by 357 days.

(21) Appl. No.: 16/591,788

(22) Filed: Oct. 3, 2019

(65) Prior Publication Data

US 2020/0192395 A1 Jun. 18, 2020

Related U.S. Application Data

(60) Provisional application No. 62/742,619, filed on Oct. 8, 2018.

(30) Foreign Application Priority Data

Mar. 12, 2019 (EP) ..................................... 19305290

(51) Int. Cl.
*G05D 1/00* (2006.01)
*G05D 1/02* (2020.01)
(Continued)

(52) U.S. Cl.
CPC ........... *G05D 1/0227* (2013.01); *B60W 10/04* (2013.01); *B60W 10/18* (2013.01); *G01V 1/003* (2013.01);
(Continued)

(58) Field of Classification Search
None
See application file for complete search history.

(56) References Cited

U.S. PATENT DOCUMENTS

2012/0037444 A1\* 2/2012 Eick ....................... G01V 1/005
181/114
2014/0196976 A1 7/2014 Phillips, III et al.
(Continued)

FOREIGN PATENT DOCUMENTS

CN 108459588 A 8/2018
EP 2 957 474 12/2015
(Continued)

OTHER PUBLICATIONS

International Search Report dated Mar. 9, 2021.
EU Search Report dated Dec. 9, 2019.
Chinese Office Action dated Mar. 4, 2022.

*Primary Examiner* — Truc M Do
(74) *Attorney, Agent, or Firm* — Ipsilon USA, LLP (57) ABSTRACT

It is proposed a positioning assistance system for a vibrator truck, that is configured to determine a vibration point distance between the vibrator truck and the vibration point location; determine a stopping distance for stopping the vibrator truck at a vibration point location, according to a determined current speed of the vibrator truck and according to a speed profile; determine a time for stopping the vibrator truck at the vibration point location according to the current speed of the vibrator truck, when the stopping distance corresponds to said vibration point distance; and trigger the lifting down of the baseplate of the vibratory system, when at least the following condition is met: said stopping time is inferior or equal to a time for lifting down the vibratory system to the ground. Corresponding vibrator truck and method are also proposed.

16 Claims, 5 Drawing Sheets

(51) Int. Cl.
*B60W 10/04* (2006.01)
*B60W 10/18* (2012.01)
*G01V 1/00* (2006.01)
*G01V 1/09* (2006.01)

(52) U.S. Cl.
CPC ........... *G01V 1/09* (2013.01); *B60W 2710/10* (2013.01); *G01V 2210/1214* (2013.01); *G01V 2210/1425* (2013.01)

(56) References Cited

U.S. PATENT DOCUMENTS

2015/0367845 A1* 12/2015 Sannodo ............... B60W 30/08
 701/23
2016/0313735 A1 10/2016 Berkemeier
2018/0240346 A1* 8/2018 Maeki ................... G01V 1/143

FOREIGN PATENT DOCUMENTS

| WO | 2013/116796 | 8/2013 |
| WO | 2013116796 | 8/2013 |

\* cited by examiner

POSITIONING ASSISTANCE SYSTEM FOR A VIBRATOR TRUCK AND CORRESPONDING VIBRATOR TRUCK AND METHOD

RELATED APPLICATION

This application claims the benefit of priority from U.S. Provisional Application No. 62/742,619 dated Oct. 8, 2018 and European Patent Application No. 19 305 290.9, filed on Mar. 12, 2019, the entirety of which is incorporated by reference.

TECHNICAL FIELD

Embodiments of the subject matter disclosed herein generally relate to vibrator is trucks and methods for positioning and controlling vibratory systems included in vibrator trucks.

DISCUSSION OF THE BACKGROUND

It is sought more particularly here below in this document to describe problems existing in the field of seismic data acquisition for oil prospecting industry. The invention of course is not limited to this particular field of application but is of interest for any technique that has to cope with closely related or similar issues and problems.

Seismic data acquisition and processing generate a profile (image) of the geophysical structure (subsurface) under the floor.

While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

The operations of acquiring seismic data on site conventionally use networks of seismic sensors, like geophones.

The seismic method is based on an analysis of reflected seismic waves.

In order to collect geophysical data in a land-based (ground) environment, one or more seismic sources in contact with the ground are activated to propagate series of omnidirectional seismic waves. The series of waves reflected by the strata of the subsurface are then detected by sensors, such as geophones, which generate a signal characterizing the reflection of the waves on the geological interfaces of the subsurface.

It is known, for instance from U.S. Pat. Nos. 8,689,928 and 9,651,692, to use a vibrator truck configured to vibrate the ground as an artificial seismic source. Traditionally, a vibrator truck comprises a vehicle (also referred to as a "mobile platform") and a vibration system (also referred to as "shaker") which are mobile relative to each other by a lift system (also referred to as "ground-hugging assembly").

The function of the vibration system is to apply, to the ground, a variable force (of the sinusoidal type for example) of predetermined nominal value.

To this end, the vibration system includes a vibrator part and a baseplate (also referred to as "support plate") for coupling to the ground. The baseplate is used to transmit the vibrations generated by the vibrator part through the ground.

The vibrator part includes a reaction mass and the vibrator system is configured to make the baseplate vibrate by reaction of movement of the reaction mass.

The vibrator part is thus used to generate a seismic vibration wave and to transmit it into the ground via the baseplate.

During a seismic survey, the seismic source has to be activated at different predefined locations while geophones acquire corresponding propagated acoustic signals. The driver of the vibrator truck thus moves the vibrator truck to a first target vibration point location. Once the vibrator truck is positioned at the vibration point location, the driver then triggers the lifting down of the vibration system for coupling the baseplate to the ground, and activate the vibrator part (actuator) so that the baseplate transmits the vibrations generated by the vibrator part to the ground. Then the vibration assembly is lifted up and the driver moves the vibrator truck to a second target vibration location.

However, as a survey implies to activate the seismic source formed by the vibratory system of the vibrator truck at numerous vibration point locations, such a survey takes a large amount of time and generates corresponding costs.

There is thus a need to reduce the time that is necessary to conduct a seismic survey with a vibrator truck.

SUMMARY

According to an embodiment, there is a positioning assistance system for a vibrator truck, said vibrator truck comprising:
a vibratory system comprising a vibratory part and a baseplate used to transmit vibrations generated by the vibratory part through the ground;
a lift system for lifting up and down the vibratory system, wherein the positioning assistance system is configured to:
determine a vibration point distance between the vibrator truck and a vibration point location;
determine a stopping distance for stopping the vibrator truck at the vibration point location, according to a determined current speed of the vibrator truck and according to a speed profile;
determine a time for stopping the vibrator truck at the vibration point location according to the current speed of the vibrator truck, when the stopping distance corresponds to said vibration point distance;
trigger the lifting down of the baseplate of the vibratory system, when at least the following condition is met: said stopping time is inferior or equal to a time for lifting down the vibratory system to the ground.

Such a configuration of the positioning assistance system and thus of the vibrator truck intended to be provided with said positioning assistance system, enables to reduce the time that is necessary to conduct a seismic survey with a vibrator truck.

This configuration prevents having to wait for the complete stopping of the vibrator truck at the target vibration point location before beginning to lift down the baseplate.

Indeed, thanks to the positioning assistance system, also referred to as an auto-guidance unit or an auto-guidance controller, the lifting down of the baseplate is triggered before the vibratory truck reaches the vibration point location. The positioning assistance system of the vibrator truck checks that conditions (rules) are met for the triggering of the lifting down of the baseplate to avoid that the lifting down begins too early.

Taking into account the duration of the lifting down, i.e. the time taken from the triggering of the lifting down to the end of the lifting down of the baseplate, with regard to the time for stopping the vibratory truck at the vibration point location, enables to take care that the baseplate has not completed (ended) its lifting down while the vibrator truck is still moving, what may damage the baseplate which could hit an obstacle such as a rock on the ground. Indeed, at the end of the lifting down, the baseplate is supposed to be in contact with the ground.

Furthermore, according to particular embodiments, the positioning assistance system of the vibrator truck enables a particular automatic control speed of the vibrator truck that enables to maintain a precise and reliable positioning of the vibrator truck at a target vibration point location, while benefiting from the triggering of the baseplate before stopping, i.e. a lifting down of the baseplate that begins before reaching the vibration point location, while ending once the vibrator truck has stopped at the vibration point location.

Once the positioning assistance system is engaged (armed), the positioning assistance system can automatically, when the condition(s) related at least to the stopping distance and the vibration point distance is(are) met, control the motor command of the vibratory truck to reach the vibration points location and, when the condition(s) related at least to the stopping time and the lifting down duration is(are) met, trigger the lifting down of the base, possibly without any action of the driver.

In other words, the positioning assistance system of the vibrator truck provides an automatically triggering of the lowering of the plate, while assisting stopping of the vibrator truck. This discharges the driver from handling speed of the vibrator truck, as well as the lowering action of the baseplate when approaching a vibration point location, while optimizing in terms of delay and location accuracy the positioning of the vibrator truck baseplate.

On the contrary, with a configuration of a vibrator truck according to prior art, when a driver of the vibrator truck drives it to a target point of vibration, the vibrator truck may not accurately arrive at a desired location or, assuming that the vibrator truck may arrive at the desired location, it will take time to have the baseplate of the vibratory system lifted down at the desired location and ready to generate vibrations.

According to a particular aspect, the positioning assistance system is configured to trigger the lifting down of the baseplate of the vibratory system when at least the further following condition is met: the vibrator truck speed is superior to a first positive threshold value.

According to a particular aspect, the positioning assistance system is configured to trigger the lifting down of the baseplate of the vibratory system when at least the further following condition is met: the vibrator truck speed is inferior to a second positive threshold value.

According to a particular aspect, the positioning assistance system is configured to determine the vibration point distance and the stopping distance in real time, and preferably as long as the positioning assistance system is in an ON state.

According to a particular aspect, the positioning assistance system is configured to trigger a decelerating phase when at least the following condition is met: the stopping distance corresponds to the distance to the vibration point location.

According to a particular aspect, an angular sector being defined with a given angular value and a top of said angular sector that corresponds to said vibration point location, a middle axis of the angular sector passing through said vibration point location and the position of the vibrator truck, the positioning assistance system, when in an ON state, is configured to run a first mode, referred to as an auto-guidance ready mode, according to which the amount of time the vibrator truck remains inside said angular sector is determined;

and wherein, when the following conditions are met:
said determined amount of time is superior or equal to a predefined time value, and
said distance to vibration point location is inferior to a predefined value or said distance to vibration is included in a given range of distances,
then the positioning assistance system is configured to run a second mode, referred to as an auto-guidance armed mode, wherein the positioning assistance system is configured to compare the stopping distance of the vibrator truck with the distance to the vibration point location, and, when the stopping distance corresponds to the distance to the vibration point location, run a third operating mode, referred to as an auto-guidance active mode, wherein the positioning assistance system is configured to operate a decelerating phase.

According to a particular aspect, the positioning assistance system is also configured to operate a speed limit phase, preferably previous to the decelerating phase, wherein the speed of the vibrator truck is limited or maintained to a given value.

According to a particular aspect, the positioning assistance is configured to operate said decelerating phase, by providing a motor command to the motor control unit, that corresponds to a command as if a pedal accelerator of the vibrator truck is released.

According to a particular aspect, the positioning assistance system is configured to operate said decelerating phase, by providing a motor command to the motor control unit, that corresponds to a given ramp angle of deceleration.

According to a particular aspect, the positioning assistance system is configured to operate said decelerating phase, until reaching a predefined speed value, for instance 0.83 m/s, at which the vibrator truck speed is maintained until at least the following condition is met: the stopping distance corresponds to the vibration point distance. The positioning assistance system can be configured to operate a further decelerating phase, also referred to as a final adjusting phase, when the distance to vibration point reaches a threshold value corresponding to the stopping distance.

According to a particular aspect, the positioning assistance system is configured to generate the speed profile based on at least:
the current speed of the vibrator truck;
a truck and land model that includes technical parameters of the vibrator truck and technical parameters of a land that is travelled by the vibrator truck.

According to an embodiment, there is a vibrator truck comprising:
a motor for moving the vibrator truck and a control system comprising a motor control unit to control the motor,
a vibratory system comprising a vibratory part and a baseplate used to transmit the vibrations generated by the vibratory part through the ground;
a lift system for lifting up and down the vibratory system, wherein the control system also includes a positioning assistance system as proposed above.

According to an embodiment, there is a method for lifting down a baseplate of a vibratory system of a vibrator truck at a vibration point location, the vibrator truck comprising:
a vibratory system comprising a vibratory part and a baseplate used to transmit the vibrations generated by the vibratory part through the ground;
a lift system for lifting up and down the vibratory system, wherein the method comprises the steps of:
- determining a vibration point distance between the vibrator truck and the vibration point location;
- determining a stopping distance for stopping the vibrator truck at a vibration point location, according to a determined current speed of the vibrator truck and according to a speed profile;
- determining a time for stopping the vibrator truck at the vibration point location according to the current speed of the vibrator truck, when the stopping distance corresponds to said vibration point distance;
- triggering the lifting down of the baseplate of the vibratory system, when at least the following condition is met: said stopping time is inferior or equal to a time for lifting down the vibratory system to the ground.

According to an embodiment, there is a non-transitory computer-readable carrier medium storing program instructions which, when executed by a computer or a processor of a control system of a vibrator truck as proposed above, causes the computer or the processor to carry out a method as proposed above.

The above cited particular features, structures or characteristics may be combined in any suitable manner in one or more embodiments.

BRIEF DESCRIPTION OF THE FIGURES

The invention is described in more detail below by way of the figures that show embodiments of the invention.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The field of the disclosure is that of acquiring geophysical and seismic data on the ground, in particular for the purpose of exploiting fields of hydrocarbons, using a vibration generating vehicle, also referred to as a vibrator or vibrator truck.

Figure 1:
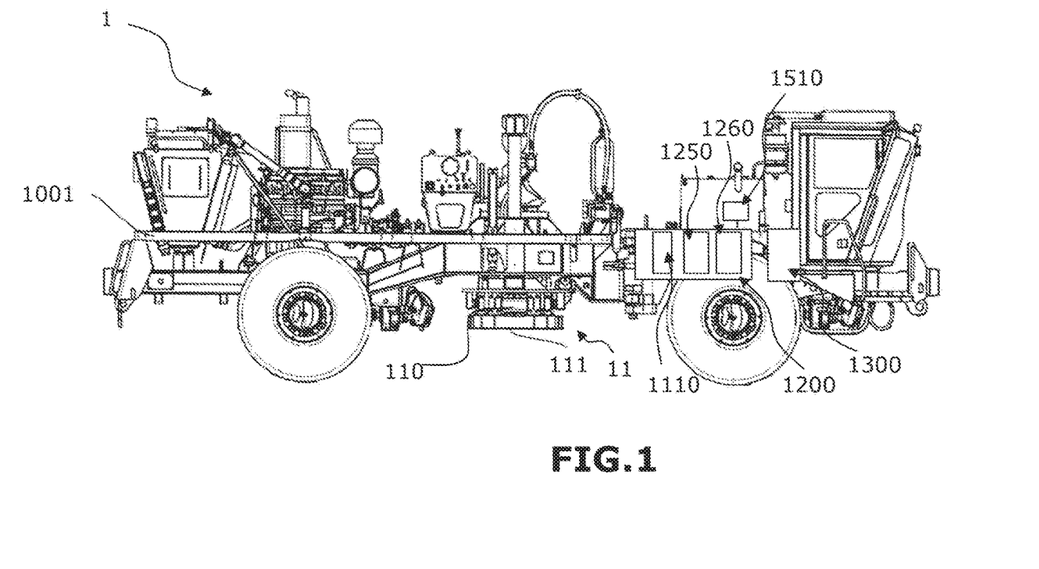
FIG. 1 is a schematic view of a vibrator truck according to an embodiment of the invention.

FIG. 1 illustrates an embodiment of a vibrator truck 1 that can be used for moving to a vibration point location, and for making the ground vibrate at said vibration points location.

The vibrator truck 1 comprises a vehicle (also referred to as a "mobile platform") 1001 and a vibration system (also referred to as "shaker") 11 which are mobile relative to each other by a lift system 12 (also referred to as "ground-hugging assembly").

The function of the vibration system 11 is to apply, to the ground, a variable force (of the sinusoidal type for example) of predetermined nominal value.

To this end, the vibration system 11 includes a vibrator part 110 and a baseplate 111 (also referred to as "support plate") for coupling to the ground. The baseplate 111 is used to transmit the vibrations generated by the vibrator part 110 through the ground.

Figure 2:
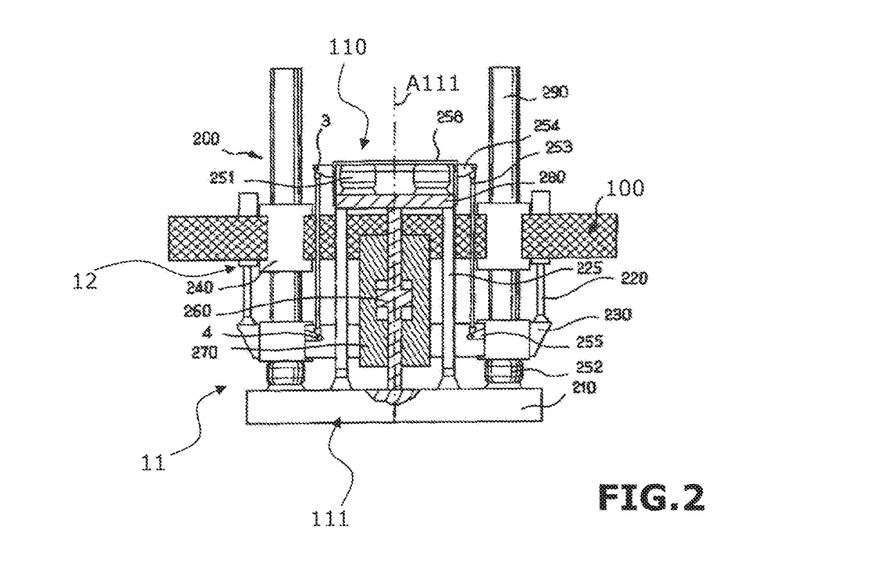
FIG. 2 is a detailed view of a vibratory system of a vibrator truck, such as the one of FIG. 1.

In the shown example of FIG. 2, the vibrator part 110 includes a reaction mass 270 and a drive piston 260. The piston 260 is used, when it is operated by a servo-valve, to guide the reaction mass 270 so as to make the baseplate vibrate by reaction of movement of the reaction mass.

The vibrator part 110 also includes an upper plate 280 and stilt legs 225. The stilt legs, located between the upper plate 280 and the baseplate 111, are intended to more evenly distribute the pressure applied by the weight of the mobile platform onto the baseplate 111.

The vibrator part is thus used to generate a seismic vibration wave and to transmit it into the ground via the baseplate 111. More details concerning the technique of the vibration system 11 can be found in U.S. Pat. No. 7,499,378, which is incorporated herein by reference. In particular, a description of elements 3, 4, 200, 251-255 and 258 is not given herein but can be found in the aforesaid US patent.

The ground-hugging assembly/lift system 12 is fixed to the vibration system, and mounted to slide on the chassis 100 of the vehicle 1001:

- firstly to place the vibration assembly on the ground or raise it. In other words, the ground-hugging assembly behaves like a lift system configured to lift the vibration assembly up (for moving the vehicle between two vibration locations) or down (for placing it on the ground, at a vibration location); and
- secondly to transfer the weight of the mobile platform onto the baseplate 111 and the top plate 280, which thus applies a static pre-load in a direction along an axis A111, to increase the power of the vibration transmitted to the ground.

In the example shown in FIG. 2, the lift system includes guide bushings 240 mounted in the chassis 100 of the vehicle in which lift (guide) columns 290 can slide, at least one footbase (also referred to as "beam") 230 secured to the lower part of the guide columns 290 and more or less perpendicular to the lift (guide) columns 290, and lift cylinders 220 mounted between the chassis 100 and the footbase 230 to control the transfer of the weight of the vehicle on the vibration assembly.

The vibrator truck 1 comprises a motor 1300, for instance a diesel engine, for moving (driving) the vibrator truck 1.

A control system 1200 comprises a motor control unit 1260 to control the motor 1300. The motor control unit 1260 can control an injection pump and associated injectors of the motor, to control the speed of the vibrator truck. The vibrator truck 1 includes a driver command system that traditionally includes a steering wheel, a pedal accelerator and a brake pedal and that can be considered as part of the control system 1200.

The vibrator truck 1 includes a baseplate controller that controls the lift system 12 and that can be considered as part of the control system 1200.

The control system 1200 also includes a positioning assistance system 1250 also referred to as an auto-guidance system. The auto-guidance system is an electronic system that can be formed by a controller that can be added in an already or not present control system of the vibratory truck, or that can have at least parts in common with a controller embedded in the vibrator truck.

In particular the auto-guidance system can include a controller configured to receive data from sensors, such as a GPS or GNSS receiver, access data stored in memories, and to execute program instructions, also referred to as guidance software, stored in a memory. The controller includes communication interfaces to transmit commands to other controllers, including the base plate controller that control lift cylinders of the lift system 12, and another controller, forming the motor control unit, that controls the speed of the vibrator truck.

During operation, a vibrator truck is moving from one vibration point to another. The vibration point may also be referred to as a shot point.

At vibration point location, the vibrator system generates vibrations that are transmitted to the ground through the baseplate. When vibrations are completed, the baseplate is raised and the vibrator truck moves to the next vibration point.

Operation of the Auto-Guidance Unit

According to particular embodiments, the auto-guidance unit 1250 operates according to a plurality of modes (or phases).

Initially, the auto-guidance unit 1250 is in an OFF state. The auto-guidance unit 1250 can be switched to an ON state in view of enabling an automatic positioning of the vibrator truck and an automatic lifting down of the baseplate as explained thereafter. The auto-guidance unit 1250 can be switched between the OFF and ON states by a button that can be operated by the driver, or any other suitable means can be used.

Phase 0

Figure 3:
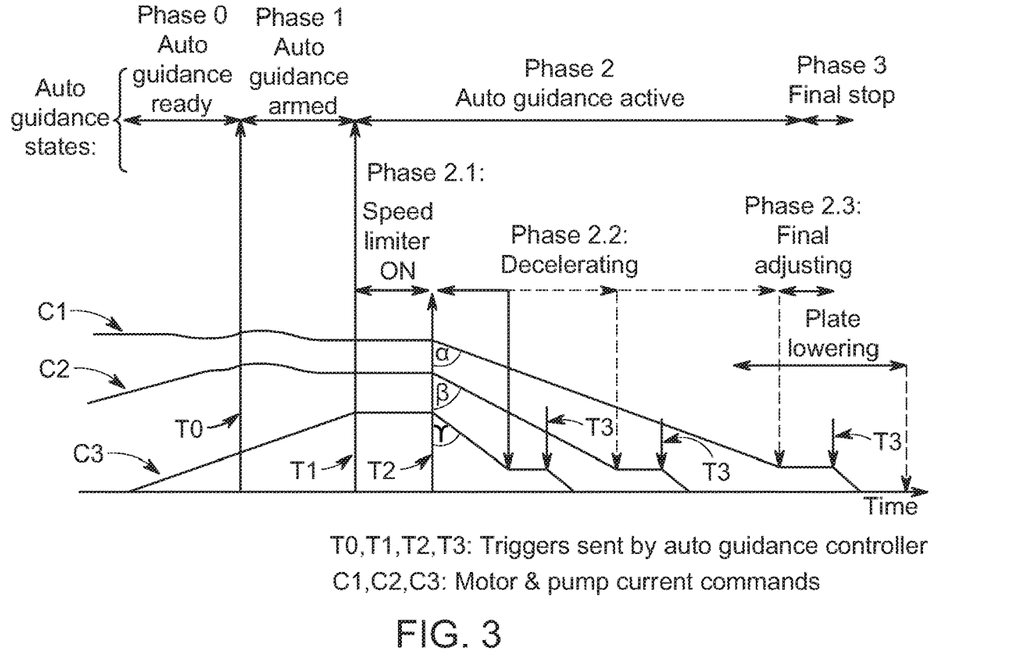
FIG. 3 is a schematic view of a vibrator truck heading towards a vibratory point, along with a representation of a plurality of zones around the vibratory point, according to an embodiment of the invention.
Figure 4:
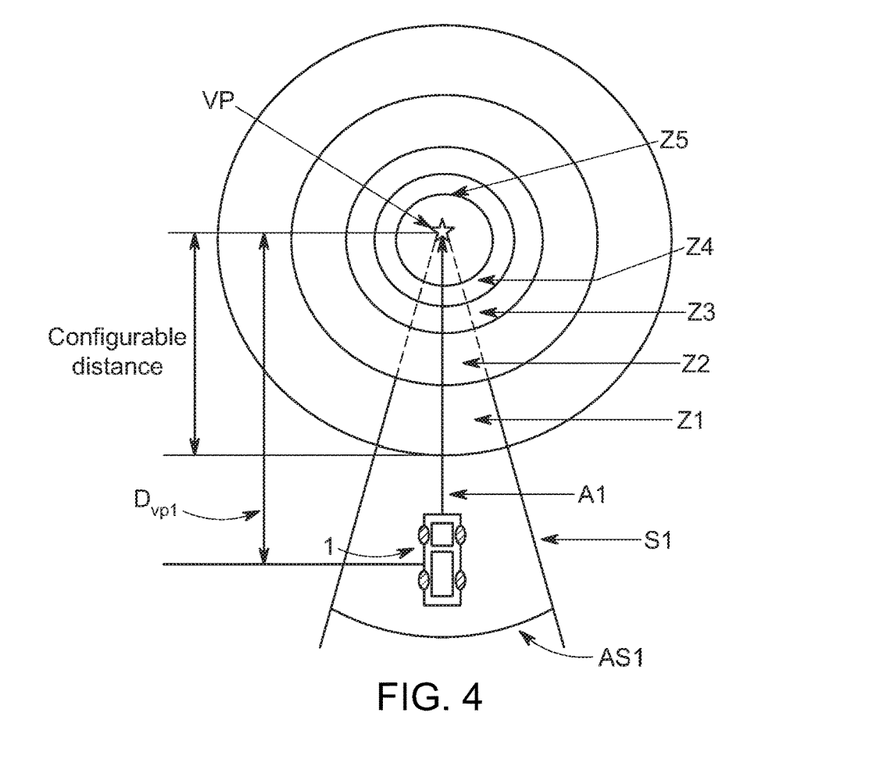
FIG. 4 is a diagram showing a plurality of operating phases of an auto-guidance system (controller) embedded in a vibrator truck according to an embodiment of the invention.
Figure 4A:
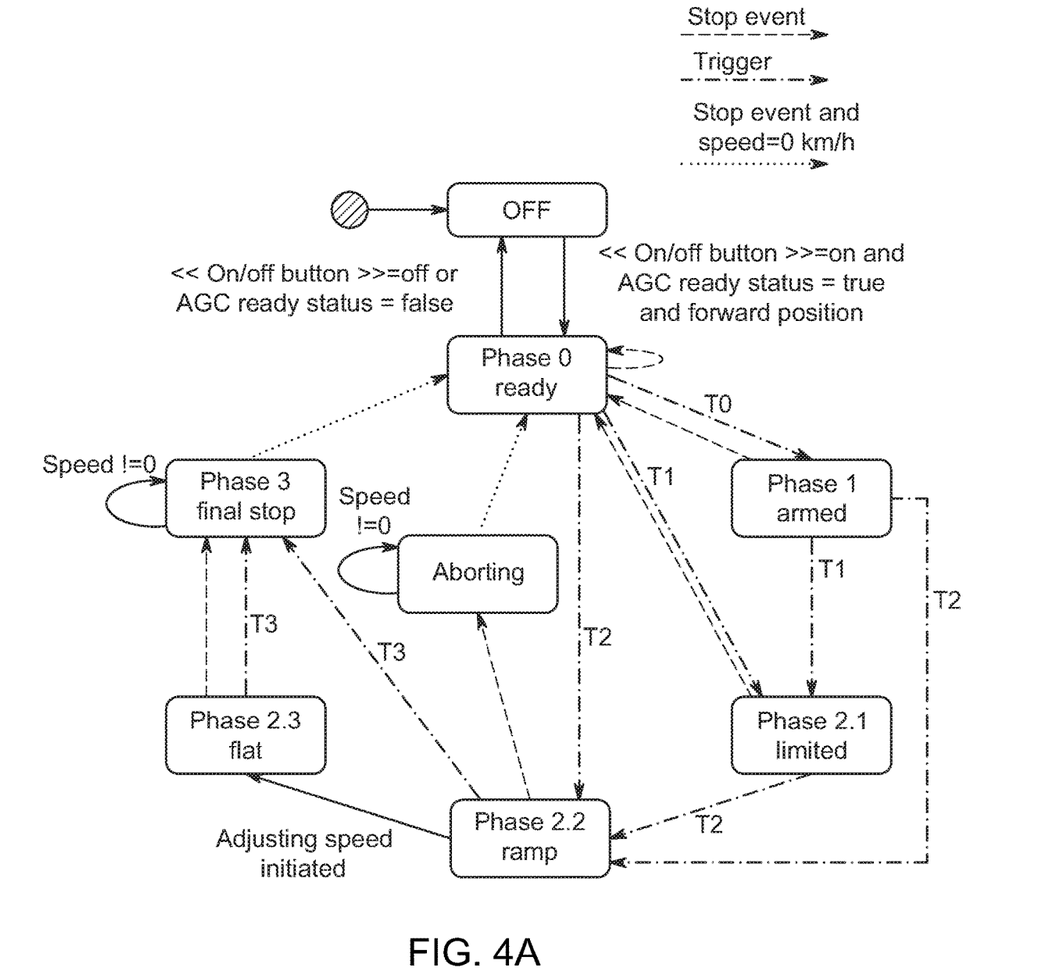
FIG. 4A is a logigram showing a plurality of operating phases (or states) of an auto-guidance system embedded in a vibrator truck according to an embodiment of the invention, and the way the auto-guidance system switches from one to the other.

According to embodiments, once the auto-guidance system 1250 has been switched to an ON state, and possibly after checking operating parameters resulting in an auto-guidance controller ready status (AGC ready status), the auto-guidance unit 1250 enters an auto-guidance ready mode, also referred to as "Phase 0" in FIGS. 3 and 4A.

The auto-guidance unit 1250 can comprise a light indicator (for instance a LED) that is off when the auto-guidance unit 1250 is in an OFF state, and that turns green when the auto-guidance unit 1250 is switched ON. The driver is thus informed that the travel speed of the vibrator truck 1 is subject to be automatically controlled, as well as the lifting down of the baseplate 111 of the vibratory system, provided that given conditions are met. According to particular aspect a light indicator (for instance a LED) turns orange from engagement of Phase 1 explained hereafter.

According to a particular aspect, acceleration of the vibrator truck 1, for instance via the accelerator pedal, is enabled during "Phase 0". Acceleration can also be authorized during "Phase 1" as explained hereinafter.

During "Phase 0", the auto-guidance unit 1250 monitors the distance $D_{vp1}$ (from the current position of the vibrator truck 1) to vibration point VP location and a parameter, referred to as "approach angle", that relates to the heading of the vibrator truck.

Distance to Vibration Point Location

According to a preferred embodiment, while the auto-guidance system 1250 is in ON state, distance $D_{vp1}$ to vibration point location is permanently computed.

The distance $D_{vp1}$ to vibration point location VP corresponds to the distance between the current location of the vibrator truck 1 and the vibration point VP location at which the vibrator truck 1 is intended to be positioned to generate vibrations and transmit them through the ground.

The distance $D_{vp1}$ to vibration point location is estimated as the length of the segment formed by the vibration point VP location and the position of the vibrator truck 1, while this distance is superior or equal to a given value. Below this given value, for instance three meters, the vibrator truck 1 is considered to be proximate to vibration point location so that the heading of the vibrator truck impacts the reliability of the computing of this distance. The distance $D_{vp1}$ to vibration point VP location is then determined as the distance between the vibrator truck 1 and the line that passes through the vibration point VP location and that is orthogonal to the speed vector of vibrator truck 1.

The current location of the vibrator truck 1 can be obtained by a positioning system, such as a GPS or GNSS system 1510 (FIG. 1), included in the vibrator truck 1. Position of the vibrator truck 1 may be considered as the position of the middle of the base plate of vibrator truck, for instance where the GPS or GNSS antenna is positioned.

According to a particular aspect, the vibration points VP location can be defined by a geologist prior to the operation of the vibrator truck, i.e. prior operating the seismic survey. According to a particular aspect, vibration points VP location may also be (re)computed or redefined during operation.

The vibration points have precise locations on the field (e.g. GPS coordinates or any other GNSS coordinates), which are recorded in a file. These vibration points VP locations can be memorized in a memory 1110 of the control system (or of the auto-guidance unit 1250). The vibration points VP locations can be computed at a central unit to draw a pattern, preferably a line or a grid on the ground.

Interval between vibration points locations may be defined in the range of 5 meters to 50 meters. According to a particular aspect, interval is constant for a given survey.

Angle Approach

Angle approach may be monitored by the auto-guidance unit 1250 as follows.

An angular sector, also referred to as a cone, is defined with a given angular value AS1, for instance 60°. The top of said angular sector corresponds to the vibration point VP location. The mid axis A1 of the angular sector S1 passes through said vibration point VP location and the current position of the vibrator truck 1.

During "Phase 0", the auto-guidance system 1250 monitors the amount of time Tas1 that the vibrator truck 1 remains inside said angular sector S1. The auto-guidance system 1250 also monitors the distance $D_{vp1}$ to the vibration point location.

The two half-lines that form the bounds of the angular sector S1 corresponds to the heading limits between which the vibrator truck 1 has to stay for at least a given amount of time, so as to meet a first condition to run a next phase. As explained hereinafter, next phase can be the triggering of an auto-guidance armed mode (also referred to as "Phase 1").

During "Phase 0", the amount of time $T_{as1}$ is compared with a predefined time that can correspond to a temporization. For instance, a temporization is triggered once the angular sector S1 is defined. When the vibrator truck 1 position exits the angular sector S1 before the end of the temporization, i.e. if the vibrator truck does not remain long enough in the angular sector S1, the angular sector S1 is redefined and the temporization is reset. The auto-guidance system 1250 thus remains in "Phase 0".

Monitoring of the time (duration) $T_{as1}$ during which the vibrator truck remains in the angular sector S1 enables to check that the vibrator truck 1 heads towards the vibration point VP location before authorizing a next phase.

According to a particular aspect, redefinition of the angular sector S1 includes updating the axis A1 with the current position of the vibrator truck 1. Position of the vibrator truck 1 is determined in real time. When the vibrator truck is heading straight on the vibration point VP location, said axis A1 matches the truck heading.

A second condition to be met relates to the current distance $D_{vp1}$ to the vibration point VP location. This current distance $D_{vp1}$ is also determined and compared to a predefined distance or range of distances. The range of distances can include a minimal distance and a maximal distance, for instance height meters for the minimal distance and for instance twenty meters for the minimal distance.

While the distance $D_{vp1}$ remains out of said range of distances, the auto-guidance system 1250 remains in "Phase 0".

When said determined amount of time Tas1 is superior or equal to the predefined value and when said distance $D_{vp1}$ to vibration point location is included in said range of distances, then the positioning assistance system 1250 generates a trigger T0 causing entrance in an auto-guidance armed mode, also referred to as Phase 1.

In a variant, monitoring of said range of distances could be replaced by checking if $D_{vp1}$ is equal or inferior to a predefined distance, and if the result is Yes (along with having Tas1 that is superior or equal to the predefined value) the positioning assistance system 1250 may generate the trigger T0 to run said auto-guidance armed mode, also referred to as Phase 1.

According to embodiments, the auto-guidance system may also be configured to enable a jump from "Phase 0" to another phase "Phase 2.1", corresponding to a speed limit phase as explained below, without passing through "Phase 1". In that case the positioning assistance system 1250 directly generates a trigger T1 explained below and as illustrated at FIG. 4A. FIG. 4A illustrates a states diagram of the auto-guidance system that summarizes its functioning and the way to switch to one operating phase to another.

According to embodiments, the auto-guidance system may be configured to enable a jump from "Phase 0" to another phase "Phase 2.2", corresponding to a deceleration phase as explained below, without passing through "Phase 1" or through "Phase 2.1". In that case the positioning assistance system 1250 directly generates a trigger T2 as illustrated at FIG. 4A.

Phase 1

When "Phase 1" is entered, the auto-guidance system 1250 is considered to be in a zone Z1 around the vibration point VP location, referred to as an armed zone or also an automatic speed control allowing zone.

From this zone Z1 corresponding to "Phase 1", the auto-guidance system 1250 is subject to trigger an automatic speed control, as well as a lifting down of the baseplate 111 of the vibratory system 11, provided that given conditions explained below are met.

During "Phase 1", the auto-guidance system 1250 computes the stopping distance $D_{stop1}$ that the vibrator truck 1 is susceptible to cover before stopping, according to a determined current speed of the vibrator truck and according to a speed profile SP1_phase1 (assuming that this speed profile is applied to the motor from the moment corresponding to this determined current speed). In particular, the speed profile is defined in function of said determined current speed. In other words, the speed profile depends on the current speed of the vibrator truck.

The current speed can be determined by the control unit 1200 using a GPS or GNNS system 1510, and/or using a speed sensor, for instance wheel speed sensors, included in the vibrator truck.

Speed Profile

Figure 6:
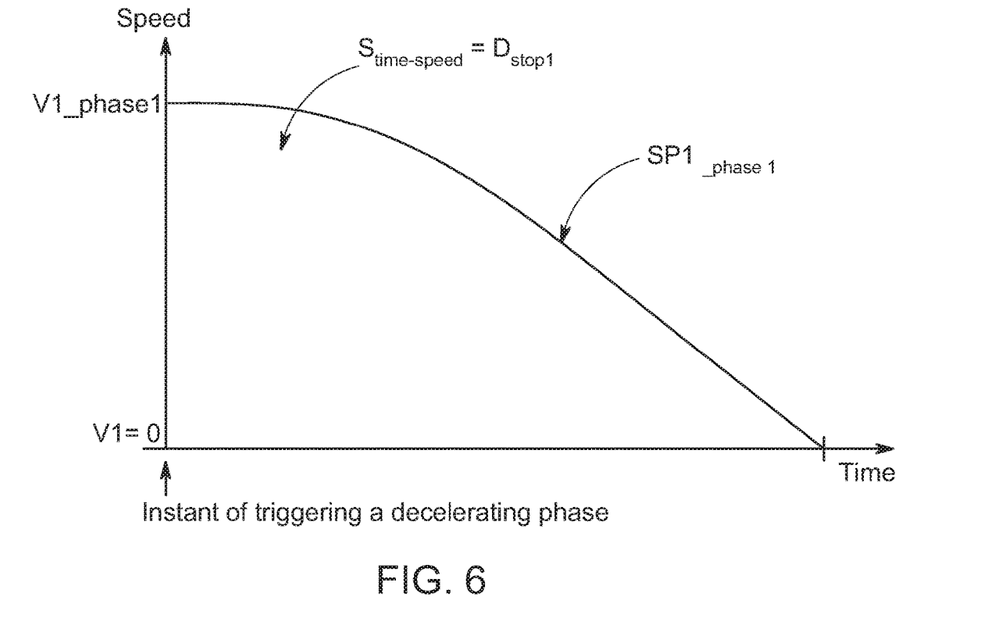
FIG. 6 is a schematic view of a speed profile that can be used by an auto-guidance system embedded in a vibrator truck according to an embodiment of the invention, when analyzing conditions for the triggering of a deceleration phase.

A speed profile corresponds to a curve providing an estimated speed of the vibrator truck in function of time. An example of a speed profile SP1_phase1 that can be used by the auto-guidance system 1250 during "Phase 1". In particular, a speed profile is generated for a current speed value, and preferably also for a current acceleration value, of the vibrator truck. The speed profile SP1_phase1 corresponds to a speed profile generated for a current speed value, and preferably also for a current acceleration value, of the vibrator truck, noted V1_phase1. As explained thereafter, the speed profile is also generated based on a truck and land model. In the example of FIG. 6, the speed profile corresponds to a decelerating profile, for instance as if no more power command was sent from the driver interface to the motor control unit (i.e. as if the accelerator pedal was entirely released). Thus, as can be observed at FIG. 6, the speed profile decreases with a ramp. The ramp value is related to the ramp value of the motor and pump command illustrated for the decelerating phase (phase 2.2) at FIG. 3 in first, second and third exemplary curves (C1, C2, C3) with respective ramp values $\alpha$, $\beta$ and $\gamma$ (gamma). According to particular aspects, the command for acceleration/deceleration of the vehicle is a combination of both a pump command and a motor command (pressure and flow rate). In order to simplify, a pump and motor command can be referred to as a "motor command".

The stopping distance Dstop1 corresponds to the area $S_{time-peed}$ defined between the abscise axis (time) and the time-speed curve SP1_phase1, starting at a speed value corresponding to the current speed value and until the speed value is equal to zero, i.e. until the intersection point of said time-speed curve SP1_phase1 with the abscises axis.

Figure 5:
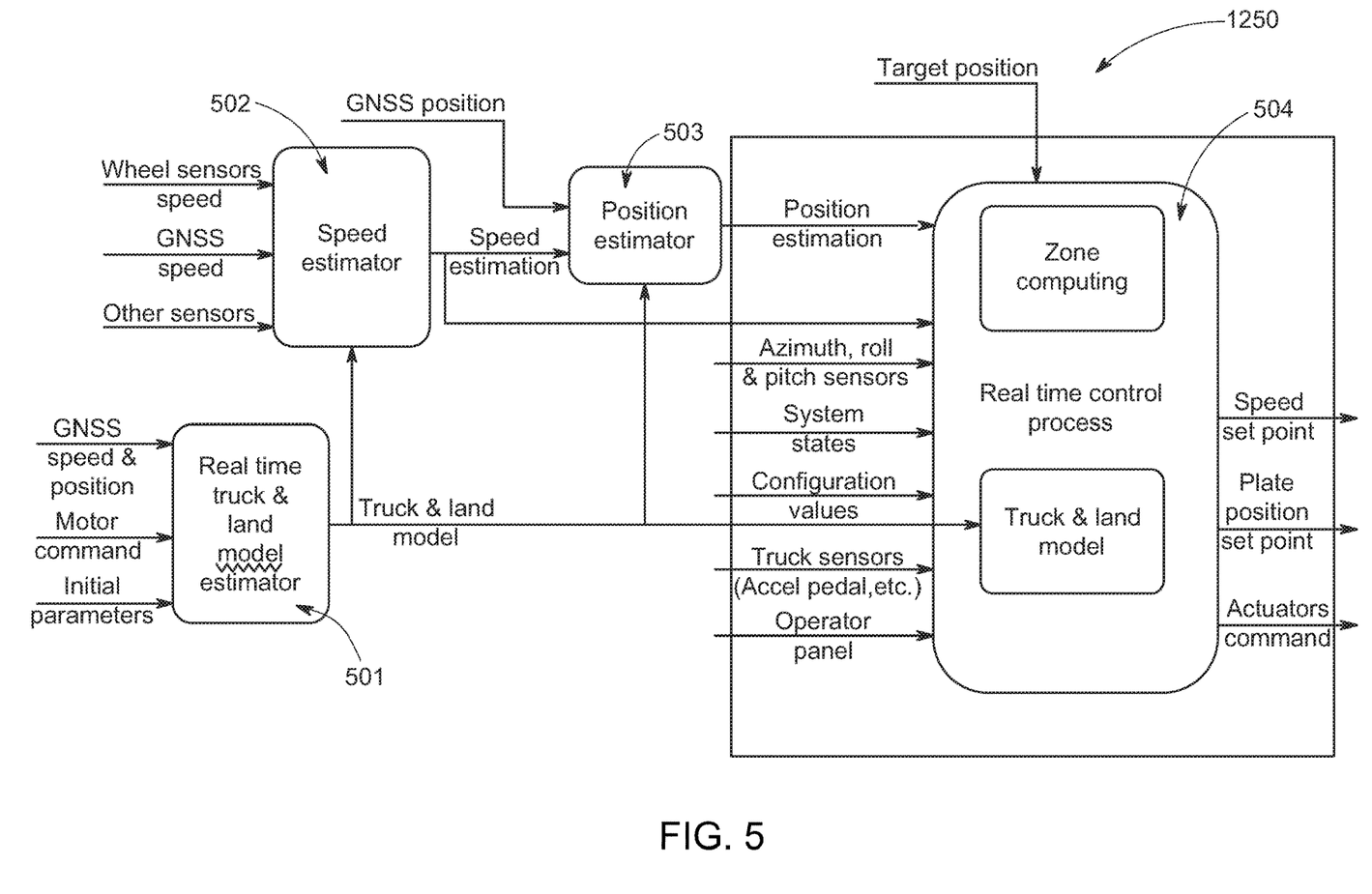
FIG. 5 is a schematic functional block view of an auto-guidance system.

Said current speed of the vibrator truck can be provided by a speed estimator module 502 that, as explained thereafter in relation with FIG. 5, provides speed estimation as input to the auto-guidance system 1250.

The speed profile is computed in real time, as well as the distance Dvp1 to vibration point VP location. According to embodiments, when the stopping distance $D_{stop1}$ (i.e. the area under the time-speed curve of the speed profile) corresponds to the distance $D_{vp1}$ to vibration point VP location, the auto-guidance system 1250 generates a trigger event T1 or T2 that triggers an auto-guidance active mode, also referred to as "Phase 2". "Phase 2" includes a decelerating phase, also referred to as "Phase 2.2", and possibly a final constant speed, also referred to as "Phase 2.3" (final adjusting). "Phase 2" can optionally include a limited speed phase also referred to as "Phase 2.1".

Phase 2

Phase 2.1

This optional speed limit phase is configured to be triggered according to the trigger event T1 preferably previous to the decelerating phase (Phase 2.2).

During the speed limit phase, the speed of the vibrator truck 1 is limited to a given value, that can correspond to the speed value estimated before entering said speed limit phase.

Phase 2.2

As explained above, decelerating phase (phase 2.2) can be triggered according to trigger event T2 when the stopping distance $D_{stop1}$ matches the distance $D_{vp1}$ to vibration point.

When "Phase 2.2" is entered, the auto-guidance system 1250 is considered to be in a zone Z2 (see FIG. 4) around the vibration point VP location, referred to as a deceleration zone Z2.

In this zone Z2, the auto-guidance system 1250 is decelerating according to a speed profile corresponding for instance to the speed profile SP1_phase1.

According to a particular embodiment, the decelerating phase results from a control of the motor 1300 of the vibrator truck 1 corresponding to an absence of power command from the driver, as if the pedal accelerator of the vibrator truck was fully released.

According to embodiments, the decelerating phase (phase 2.2) results from a motor command provided by the auto-guidance system 1250 to the motor control unit 1260 according to which the vibrator truck decelerates according to a given ramp angle. Said given angle can be function of the current speed of the vibrator truck. The angle can also be function of parameters related to the vibrator truck and/or to the land travelled by the vibrator truck that can be provided by a truck and land model estimator 501, as explained thereafter in relation with FIG. 5.

According to embodiments, the auto-guidance active mode ("Phase 2") also includes a final constant speed phase (or Adjusting phase), also referred to as "Phase 2.3". According to these embodiments, when operating "Phase 2.2", the auto-guidance system 1250 monitors the speed of the vibrator truck. When the current speed of the vibrator truck falls and reaches a given speed value, for instance 0.83 m/s, and if Dstop1 does not correspond to Dvp1 (or if Dvp1 is to superior or equal to a predefined value), the vibrator truck speed is maintained at this given speed value.

According to other embodiments, if Dstop1 corresponds to Dvp1 (or if Dvp1 is inferior to a predefined value), the auto-guidance system may also jump from "Phase 2.2" to another phase: Phase 3, without passing through "Phase 2.3". In that case the positioning assistance system 1250 directly generates trigger T3 explained below and as illustrated at FIGS. 3 and 4A.

Phase 2.3

According to embodiments, the auto-guidance system 1250 is configured to trigger Phase 2.3 when current stopping distance DStop1 no more matches Dvp1, and when the current speed of the vibrator truck falls and reaches a given speed value. It can be considered that current stopping distance Dstop1 no more matches Dvp1 if $D_{stop1}$ differs from $D_{vp1}$ with a value $d_{res}$ superior to a threshold given value (that can correspond to the radius of tolerance ring zone Z5).

The vibrator truck speed V1 is maintained at a given speed value until the current stopping distance Dstop1 corresponds to the current distance $D_{vp1}$ to vibration point.

When "Phase 2.3" is entered, the auto-guidance system 1250 is considered to be in a zone Z3 around the vibration point VP location, referred to as a final position adjustment zone.

In this zone Z3 corresponding to "Phase 2.3", the auto-guidance system 1250 maintains a certain speed to compensate a too short stopping distance DStop1 with regard to the distance $D_{vp1}$ to vibration point.

The current stopping distance $D_{stop1}$ can be considered as corresponding to the current vibration point distance $D_{vp1}$ when $D_{vp1}=D_{stop1}+d_{res}$, wherein $d_{res}$ is a value inferior to a given value corresponding to a tolerance position around the vibration point location. This given value can be considered as the radius of the tolerance ring zone Z5 as illustrated at FIG. 4. This aspect also applies for the analysis of Dstop1 in the other phases.

According to embodiments the auto-guidance system 1250 is configured to end "Phase 2.3" when the current stopping distance Dstop1 matches the current distance Dvp1 to vibration point. According to embodiments, this can be obtained by determining when the current distance Dvp1 to vibration point reaches a given threshold value. This value can correspond to the distance that the vibrator truck 1 covers, in the hypothesis of a releasing (absence) of the acceleration command, while the vibrator truck is at a current speed corresponding to said maintained speed value.

The auto-guidance system 1250 then generates a trigger event T3 that triggers a final stop mode, also referred to as "Phase 3".

According to embodiments and as illustrated at FIG. 4A, trigger event T3 can also be generated at Phase 2.2 (deceleration phase) to trigger "Phase 3" without passing through "Phase 2.3".

Phase 3

"Phase 3" enables to have the truck immobilized at the vibration point location. In "Phase 3", the auto-guidance system 1250 provides commands to motor control unit to make the vibrator truck decelerate.

This final deceleration can be controlled as for "Phase 2.2" according to a given speed profile that can correspond to a predefined ramp deceleration. The final deceleration triggered by the auto-guidance system can correspond to an absence of power command from the driver, as if the accelerator pedal was released.

Lowering of the Baseplate

The positioning assistance system 1250 computes the vibration point distance $D_{vp1}$ between the vibrator truck 1 and the vibration point VP location. The positioning assistance system 1250 also computes a stopping distance DStop1 for stopping the vibrator truck 1 at a vibration point location, according to a determined current speed of the vibrator truck and according to a speed profile.

Figure 7:
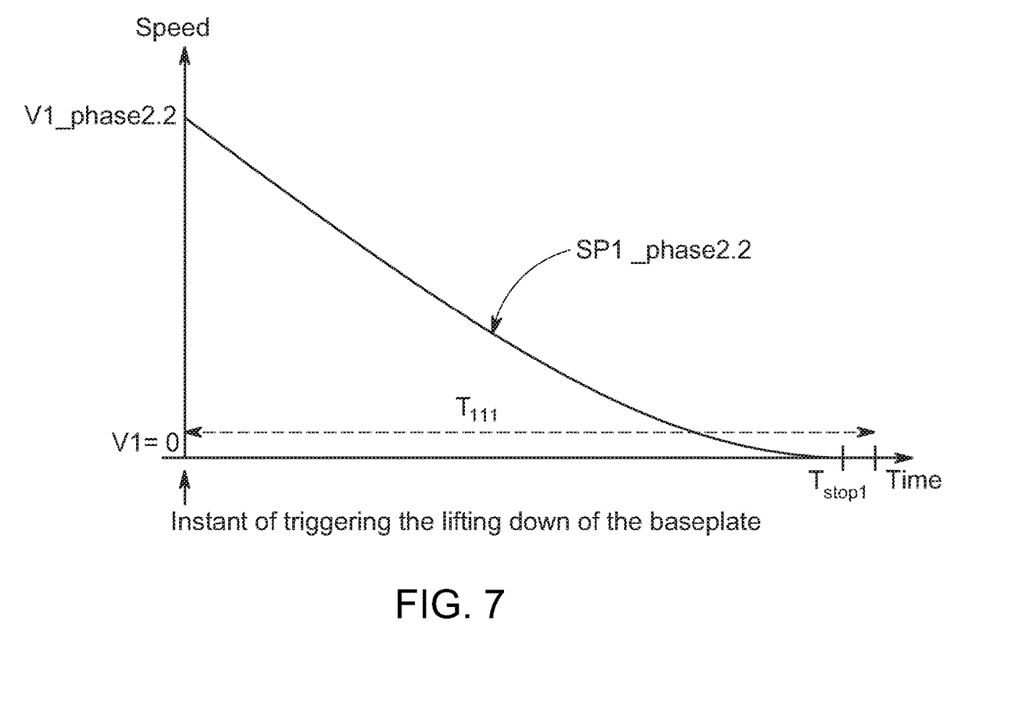
FIG. 7 is a schematic view of a speed profile that can be used by an auto-guidance system embedded in a vibrator truck according to an embodiment of the invention, when analyzing conditions for the triggering of a lifting down of the baseplate.

An exemplary speed profile, referred to as $SP1_{\_phase2.2}$, is illustrated at FIG. 7. This speed profile corresponds to a speed profile generated for a current speed value (and preferably also for a current acceleration value) of the vibrator truck, noted $V1_{\_phase2.2}$. The lowering is preferably triggered during the deceleration phase 2.2, but could be triggered at another moment, in particular from the moment of phase 1. As explained thereafter the speed profile is also generated based on a truck and land model. In the example of FIG. 7, the speed profile corresponds to a decelerating profile, for instance as if no more power command was sent from the driver interface to the motor control unit (i.e. as if the accelerator pedal was entirely released). Thus, as can be observed at FIG. 7, the speed profile decreases with a given ramp value.

The auto-guidance system is configured for determining a time $T_{stop1}$ for stopping the vibrator truck 1 at the vibration point location according to the current speed of the vibrator truck when estimated stopping distance $D_{stop1}$ corresponds to said vibration point distance Dvp1.

This time Tstop1 corresponds to the time for which the speed according to the curve of the deceleration profile reaches zero (i.e. the time at which the deceleration curve crosses the abscise axis).

Lowering of the baseplate can be triggered when time Tstop1 for stopping the vibrator truck 1 at a vibration point location is inferior or equal to a time $T_{111}$ for lifting down the vibratory system 11 to the ground. At this time Tstop1, the vibrator truck 1 is considered as being in zone Z4 (initiating lowering base plate zone).

This time T111 can be a predefined value, that can have been previously measured and memorized in a memory of the auto-guidance system. This value can be an external data for instance provided the constructor of vibratory system. This time corresponds to the duration between the instant at which the lifting down of the baseplate is triggered and the instant at which the lowering of the baseplate is complete, that can be detected with sensors (accelerometers, GPS/GNSS system) detecting vibrations when the baseplate touches the ground. Present existing sensors, like a pressure switch, for detecting the low position of the baseplate, and/or other distance sensor for controlling the actual height of the baseplate relative to the ground can also be used in combination.

In embodiments, in particular for safety reasons, the lowering of the baseplate cannot be automatically initiated if speed of the vehicle is below a certain value. Even though presence of people below the truck is not allowed while the truck is powered, this prevents accidental presence of human while lowering the base plate such as for maintenance operator.

The lifting down of the vibratory system can be conditioned to a truck speed inferior to a positive threshold value. Such criterion enables to determine that the vibrator truck runs not too fast and at a speed, for instance inferior to 1,3 m/s, that enables stopping in a short and reliable time. A condition for the lowering can be that the vibrator truck is in a decelerating phase or is at a constant speed after said decelerating phase.

A further condition for triggering Phase 2.3 can be that the time remaining before the baseplate 111 of the vibratory system 11 touches the ground $t_{11rem}$ is superior or equal to the current stopping time $T_{stop1}$ plus a residual time $t_{res}$ that is a given value.

According to embodiments, the base plate lowering is initiated only when a deceleration phase is activated.

According to embodiments, it is proposed to compute permanently the time necessary to stop the truck at or near the vibration point (if the point is located inside the allowance zone) and the distance to the vibration point.

Auto-Guidance System and Parameters

The auto-guidance system 1250 corresponds to an informatic and electronic system that uses:

A real time truck and land model estimator 501 that provides a truck and land model based on pre-analysis and/or real time computation. This truck and land model can take as inputs: the speed and position of the vibrator truck provided by the GNSS system, and the motor command. Initial parameters can also be used as input such as the type of land, the type of motorization, duty cycle of the injectors of the motor.

A speed estimator 502 using wheel sensors and GNSS system to provide speed of the vibrator truck as inputs. The truck and land model is also used as inputs of the speed estimator. The speed estimator outputs a speed estimation that is used as input by a position estimator 503 along with the position of the vibrator truck provided by the GNSS system. The position estimator outputs a position estimation of the truck vibrator.

A controller 604 that can take as inputs:
  the position estimation provided by the position estimator, that can be used to improve accuracy and availability of the speed for the real time control process;
  the speed estimation provided by the speed estimator, that can be used to improve accuracy and availability of the field position for the real time control process;
  Azimuth, roll and pitch sensors used by the real time control process to improve position accuracy and safety of the vibratory truck
  Configuration values;
  Truck sensors such as the acceleration pedal
  The operator interface that enables him switching the auto-guidance system between OFF and ON States. The operator interface also can display feedback such as the green or orange color of the indicator light;
  The truck and land model that characterizes the truck and land in order to adapt its real-time control process. Such characterization can for example be used to update the known phase or delay of the mechanical components such as valves or pumps in order to take in consideration the alteration of components over the time.
  The target position that correspond to the vibration point location where the truck has to stop.

The auto-guidance system 1250 runs a real time control process and, when conditions are met, as explained above, output a speed set point that inputs the motor control unit 1260 to control the motor and thus the speed of the vibrator truck. The auto-guidance system also output a command to trigger the lifting down of the baseplate when other conditions are met, as explained above.

According to embodiments, the auto-guidance system can also output particular actuators commands, such as commands to third party controllers to control elements such as lamps, brake etc. . . .

According to particular embodiments, the auto-guidance system 1250 can thus automatically handle the baseplate position during a vibro-seismic mission, based on:
  the position to vibrate (vibration point location);
  real time analyzing of the vibrator truck speed during vibration point approach;
  pre and real time analyzing distance to vibration point during approach phase;
  pre and real time characterization of truck components. The auto-guidance system computes and updates in real time a model to predict the behavior of the truck components such as the baseplate controller delay or the motor speed with regard to input acceleration command.
  pre and real time characterization of land (slope, adherence). The system computes and updates in real time a model to predict the behavior of the ground speed with regard to input acceleration command, inclination sensors and initial parameters, such as land type.

The auto-guidance system 1250 is said as engaged when without any action the auto-guidance system is susceptible to position and lift down automatically the baseplate on the next vibration point location.

According to a particular aspect, the speed profile corresponds to a deceleration profile. According to embodiments, the deceleration profile includes a deceleration ramp having a given angle of ramp. The deceleration profile can correspond to the motor command when the driver releases, preferably entirely, the accelerator.

Other Aspects:

The auto-guidance system 1250 is configured to be disengaged, by switching to auto-guidance ready mode-phase 0 and potentially to state OFF, when at least one of the following conditions is met:
 a physical full release of the pedal accelerator is detected during a predefined amount of time;
 a pressure on the brake pedal is detected.

The auto-guidance system 1250 can also be disengaged by switching to state OFF, when at least one of following condition is met:
 an error system occurs, for instance because of a failure of the GNSS system;
 the auto-guidance assistance system is turned off.

In particular FIG. 4A shows that a stop event, such as one corresponding to one of the above conditions, can trigger aborting of "Phase 2.2", that corresponds to the main decelerating phase, making the auto-guidance system 1250 return at "Phase 0" when speed comes to zero. A stop event during Phase "2.3" can also trigger the final stop mode "Phase 3" making the auto-guidance system 1250 return at "Phase 0" when speed comes to zero.

According to embodiments a "Stop events" can include at least part of the following events detected:
 Braking pedal pressed
 Accelerator pedal fully released
 a reset message such as "Reset Auto-guidance" on the network of the vibrator truck
 ON/OFF button=OFF
 parameter auto-guidance controller (AGC) ready status=FALSE According to embodiments, the control unit 1200 is configured to allow acceleration of the vibrator truck only if at least one of the following conditions is met:
 the auto-guidance system 1250 is in the OFF state,
 the auto-guidance system 1250 is in an operating mode corresponding to the auto-guidance ready mode, also referred to as "Phase 0";
 the auto-guidance system 1250 is in an operating mode corresponding to an auto-guidance armed mode, also referred to as "Phase 1".

In particular, out of these conditions, the auto-guidance system 1250 is configured to maintain the speed at a constant value or enable deceleration of the vehicle according to a ramp whose value of angle can vary in function of the value of speed previous to the triggering of the decelerating phase.

According to an example, the vibrator truck may present the following features:
 A diesel engine and hydraulic pumps
 Power of 328 kW
 Top speed of 25 km/h
 Average speed in operation between 10 and 15 km/h
 Overall length of 10 meters
 A wheel base of 5,5 metes
 A weight 31 metric tons The above-described functions and steps may be implemented in the form of a computer program or via hardware components (e.g. programmable gate arrays). In particular, the functions and the steps performed by the control system, the auto-guidance system, or the motor control unit, may be performed by sets of computer instructions or modules implemented by a processor or a controller or they may be performed by dedicated electronic components of the field-programmable gate array (FPGA) or application-specific integrated circuit (ASIC) type. It is also possible to combine computer parts and electronic parts.

The computer programs, or computer instructions, may be contained in program storage devices, e.g. computer-readable digital data storage media, or executable programs. The programs or instructions may also be executed from program storage peripherals.

The tolerance zone corresponds to a zone where it is acceptable to shot if the distance between the truck and the shot point is under a predefined limit (example: obstacle on the field which does not allow reaching the shot point)

It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A positioning assistance system for a vibrator truck, said vibrator truck comprising:
 a motor for moving the vibrator truck and a control system comprising a motor control unit to control the motor;
 a vibratory system comprising a vibratory part and a baseplate used to transmit vibrations generated by the vibratory part through the ground;
 a lift system for lifting up and down the vibratory system, wherein the positioning assistance system is configured to:
 determine a vibration point distance between the vibrator truck and a vibration point location;
 determine a stopping distance that the vibrator truck is susceptible to cover before stopping according to a deceleration speed profile generated for a determined current speed value of the vibrator truck, assuming that this deceleration speed profile is applied to the motor of the vibrator truck from the moment corresponding to this determined current speed value;

determine a time for stopping the vibrator truck at the vibration point location according to the current speed of the vibrator truck, when the stopping distance corresponds to said vibration point distance;

trigger the lifting down of the baseplate of the vibratory system, when at least the following conditions are met: the vibrator truck speed is greater than a first positive threshold value and said stopping time is less than or equal to a time for lifting down the vibratory system to the ground, so that the lifting down of the baseplate is triggered before the vibratory truck reaches the vibration point location.

2. The positioning assistance system according to claim 1, wherein the positioning assistance system is configured to trigger the lifting down of the baseplate of the vibratory system when at least the further following condition is met: the vibrator truck speed is less than a second positive threshold value.

3. The positioning assistance system according to claim 1, wherein the positioning assistance system is configured to determine the vibration point distance and the stopping distance in real time.

4. The positioning assistance system according to claim 1, wherein the positioning assistance system is configured to determine the vibration point distance and the stopping distance in real time as long as the positioning assistance system is in an ON state.

5. The positioning assistance system according to claim 1, wherein the positioning assistance system is configured to trigger a decelerating phase when at least the following condition is met: the stopping distance corresponds to the vibration point distance.

6. The positioning assistance system according to claim 1, wherein, an angular sector being defined with a given angular value and a top of said angular sector that corresponds to said vibration point location, a middle axis of the angular sector passing through said vibration point location and the position of the vibrator truck, the positioning assistance system, when in an ON state, is configured to run a first mode, referred to as an auto-guidance ready mode, according to which the amount of time the vibrator truck remains inside said angular sector is determined;

and wherein, when the following conditions are met:

said determined amount of time is greater than or equal to a predefined time value, and said vibration point distance is less than to a predefined value or said vibration point distance is included in a given range of distances, then the positioning assistance system is configured to run a second mode, referred to as an auto-guidance armed mode, wherein the positioning assistance system is configured to compare the stopping distance of the vibrator truck with the vibration point distance, and, when the stopping distance corresponds to the vibration point distance, run a third operating mode, referred to as an auto-guidance active mode, wherein the positioning assistance system is configured to operate a decelerating phase.

7. The positioning assistance system according to claim 5, wherein the positioning assistance system is also configured to operate a speed limit phase wherein the speed of the vibrator truck is limited or maintained to a given value.

8. The positioning assistance system according to claim 7, wherein the positioning assistance system is configured to operate the speed limit phase previous to the decelerating phase.

9. The positioning assistance system according to claim 5, wherein the positioning assistance is configured to operate said decelerating phase, by providing a motor command to the motor control unit, that corresponds to a command as if a pedal accelerator of the vibrator truck is released.

10. The positioning assistance system according to claim 5, wherein the positioning assistance system is configured to operate said decelerating phase, by providing a motor command to the motor control unit, that corresponds to a given ramp angle of deceleration.

11. The positioning assistance system according to claim 5, wherein the positioning assistance system being configured to determine the vibration point distance and the stopping distance in real time, the positioning assistance system is configured to operate said decelerating phase, until reaching a predefined speed value at which the vibrator truck speed is maintained until at least the following condition is met: the stopping distance corresponds to the vibration point distance.

12. The positioning assistance system according to claim 11, wherein the positioning assistance system is configured to operate a further decelerating phase, also referred to as a final adjusting phase, when the vibration point distance reaches a threshold value corresponding to the stopping distance.

13. The positioning assistance system according to claim 1, wherein the positioning assistance system is configured to generate the deceleration speed profile based on at least:

a truck and land model that includes technical parameters of the vibrator truck and technical parameters of a land that is travelled by the vibrator truck.

14. A vibrator truck comprising:

a motor for moving the vibrator truck and a control system comprising a motor control unit to control the motor, a vibratory system comprising a vibratory part and a baseplate used to transmit vibrations generated by the vibratory part through the ground;

a lift system for lifting up and down the vibratory system, wherein the control system also includes a positioning assistance system according to claim 1.

15. A method for lifting down a baseplate of a vibratory system of a vibrator truck at a vibration point location, the vibrator truck comprising:

a motor for moving the vibrator truck and a control system comprising a motor control unit to control the motor;

a vibratory system comprising a vibratory part and a baseplate used to transmit the vibrations generated by the vibratory part through the ground;

a lift system for lifting up and down the vibratory system, a positioning assistance system, wherein the method comprises the following steps that are carried out by the positioning assistance system:

determining a vibration point distance between the vibrator truck and the vibration point location;

determining a stopping distance that the vibrator truck is susceptible to cover before stopping, according to a deceleration speed profile generated for a determined current speed value of the vibrator truck, assuming that this deceleration speed profile is applied to the motor of the vibrator truck from the moment corresponding to this determined current speed value;

determining a time for stopping the vibrator truck at the vibration point location according to the current speed of the vibrator truck, when the stopping distance corresponds to said vibration point distance;

triggering the lifting down of the baseplate of the vibratory system, when at least the following conditions are met: the vibrator truck speed is greater than a first positive threshold value and said stopping time is less than or equal to a time for lifting down the vibratory system to the ground, so that the lifting down of the baseplate is triggered before the vibratory truck reaches the vibration point location.

16. A non-transitory computer-readable carrier medium storing program instructions which, when executed by a computer or a processor of a positioning assistance system of a control system of a vibrator truck according to claim 14, causes the computer or the processor to carry out a method that comprises the steps of:

determining a vibration point distance between the vibrator truck and the vibration point location;

determining a stopping distance that the vibrator truck is susceptible to cover before stopping, according to a deceleration speed profile generated for a determined current speed value of the vibrator truck, assuming that this deceleration speed profile is applied to the motor of the vibrator truck from the moment corresponding to this determined current speed value;

determining a time for stopping the vibrator truck at the vibration point location according to the current speed of the vibrator truck, when the stopping distance corresponds to said vibration point distance;

triggering the lifting down of the baseplate of the vibratory system, when at least the following conditions are met: the vibrator truck speed is greater than a first positive threshold value and said stopping time is less than or equal to a time for lifting down the vibratory system to the ground, so that the lifting down of the baseplate is triggered before the vibratory truck reaches the vibration point location.

* * * * *